(12) United States Patent  
Griggs et al.

(10) Patent No.: US 8,825,192 B2  
(45) Date of Patent: Sep. 2, 2014

(54) APPARATUS AND METHOD FOR DIMENSIONAL METROLOGY

(71) Applicant: Hexagon Metrology AB, Stockholm (SE)

(72) Inventors: Anthony J. Griggs, Salem, CT (US); Charles Burbank, Rehoboth, MA (US); William Wilcox, Danville, CA (US); Kenneth Woodbine, Elk Grove Village, IL (US)

(73) Assignee: Hexagon Metrology AB, Stockholm (SE)

( * ) Notice: Subject to any disclaimer, the term of this patent is extended or adjusted under 35 U.S.C. 154(b) by 7 days.

(21) Appl. No.: 13/789,759

(22) Filed: Mar. 8, 2013

(65) Prior Publication Data

US 2013/0282162 A1    Oct. 24, 2013

Related U.S. Application Data

(63) Continuation of application No. 10/687,861, filed on Oct. 17, 2003, now Pat. No. 8,417,370.

(51) Int. Cl.

| | |
|---|---|
| *G06F 19/00* | (2011.01) |
| *G05B 19/401* | (2006.01) |
| *G05B 19/4097* | (2006.01) |
| *G05B 19/18* | (2006.01) |

(52) U.S. Cl.  
CPC .............. *G05B 19/18* (2013.01); *G05B 19/401* (2013.01); *G05B 2219/37198* (2013.01); *G05B 2219/37452* (2013.01); *G05B 2219/50252* (2013.01); *G05B 19/4097* (2013.01)

USPC .............................. 700/185; 700/174; 702/83

(58) Field of Classification Search  
USPC ............... 700/81, 84, 95, 112, 160, 172, 175, 700/184, 185, 190, 194–195; 703/82  
See application file for complete search history.

(56) References Cited

U.S. PATENT DOCUMENTS

| | | | |
|---|---|---|---|
| 5,025,362 A | | 6/1991 | Darlington et al. |
| 5,198,900 A | * | 3/1993 | Tsukagoshi .............. 375/240.16 |
| 5,381,339 A | | 1/1995 | Yoko et al. |
| 5,398,314 A | | 3/1995 | Saito et al. |
| 5,418,730 A | * | 5/1995 | Mariani et al. ................. 700/180 |
| 5,444,614 A | | 8/1995 | Saito et al. |
| 5,953,687 A | | 9/1999 | Zink et al. |
| 6,366,831 B1 | * | 4/2002 | Raab ............................. 700/262 |

(Continued)

FOREIGN PATENT DOCUMENTS

| | | |
|---|---|---|
| CN | 1737495 A | 2/2006 |
| EP | 0879674 A1 | 11/1998 |

(Continued)

*Primary Examiner* — Kidest Bahta  
(74) *Attorney, Agent, or Firm* — Wolf, Greenfield & Sacks, P.C.

(57) ABSTRACT

Generating a machine tool program for performing coordinate measurements. The machine tool program may be communicated to a machine tool controller such that the machine tool controller is operable to execute the machine tool program. The machine tool program may be generated from a dimensional metrology program. As part of generating the machine tool program, a path definition and a machine definition may be combined. Measurement data resulting from an execution of the machine tool program may be received by a data server and analyzed using dimensional metrology analysis. Indicators may be provided within the machine tool program to be used during dimensional metrology analysis.

10 Claims, 12 Drawing Sheets

(56) References Cited

U.S. PATENT DOCUMENTS

| | | |
|---|---|---|
| 6,415,191 B1 | 7/2002 | Pryor |
| 6,671,571 B1 | 12/2003 | Matsumiya et al. |
| 6,721,675 B1 | 4/2004 | Chawla |
| 7,278,222 B2 | 10/2007 | Maier et al. |
| 7,499,719 B2 * | 3/2009 | Rengaraju et al. ............ 455/518 |
| 7,784,194 B2 * | 8/2010 | Raab et al. ...................... 33/503 |
| 2007/0005178 A1 | 1/2007 | Prestidge et al. |
| 2007/0051179 A1 | 3/2007 | McMurtry et al. |

FOREIGN PATENT DOCUMENTS

| | | |
|---|---|---|
| JP | 7210586 A | 8/1995 |
| JP | 2005127825 A | 5/2005 |
| WO | WO 88/03673 A1 | 5/1988 |
| WO | WO 95/21417 A1 | 8/1995 |
| WO | WO 02/086636 | 10/2002 |
| WO | WO 03/012561 A2 | 2/2003 |
| WO | WO 2004/072740 A2 | 8/2004 |

* cited by examiner

APPARATUS AND METHOD FOR DIMENSIONAL METROLOGY

CROSS-REFERENCE TO RELATED APPLICATIONS

This application is a continuation of and claims priority under 35 U.S.C. §120 to U.S. Ser. No. 10/687,861 filed Oct. 17, 2003, entitled "APPARATUS AND METHOD FOR DIMENSIONAL METROLOGY", which is herein incorporated by reference in its entirety.

FIELD OF THE INVENTION

The present invention relates generally to dimensional metrology, and more specifically to the generation and/or execution of coordinate measurement programs for machine tools.

DISCUSSION OF RELATED ART

Dimensional metrology is used to measure the conformity of a workpiece to its intended design. Coordinate measurement machines (CMMs), both contact and noncontact, have been used to gather dimensional data on the location of points, edges, planes, surfaces and other part features. Operators and engineers analyze the dimensional data to determine how closely a workpiece matches its design. Various analysis tools, such as dimensional metrology software packages, aid the operators and engineers with this analysis.

Outfitted with a sensor, a CMM can be controlled by a CMM application to measure numerous points on a workpiece and to provide enough raw data to investigate the dimensional metrology of the manufactured piece and its features. As illustrated in FIG. 1, a CMM application running on a computer 102 issues commands that control the movements and measurements performed by a CMM 104. Typically, the control of the CMM 104 is interactive, that is, measurement data returned by the CMM 104 is analyzed by the CMM application, and subsequent commands provided by the CMM application are based on an analysis of the returned measurement data. Historically, CMM investigations (e.g., using a CMM 104 and a CMM application running on a computer 102) have been performed off-line, that is, away from the machine shop floor and in an area with a well-controlled environment. As such, CMMs were used more for quality assurance, rather than in-process as part of manufacturing process control.

More recently, there has a been a move toward integrating coordinate metrology into the manufacturing process. As part of this trend, CMMs are being moved to the shop floor and used between manufacturing steps to analyze parts and processes. This strategy can lead to a better understanding of both the causes and results of machining errors and can also reduce waste by flagging non-conforming parts earlier in the process.

Even with CMMs integrated into the manufacturing process, however, the act of removing a workpiece from a machine tool and fixturing it in a CMM for coordinate measurement can cause undesirable delays and changes to workpiece geometry. For example, removing a thin-walled or flexible part from a machine tool puts the part into a free state, and correlating measurements that are obtained after re-fixturing the part can be difficult or impossible. Large workpieces also present difficulties as a CMM must be large enough to handle the workpieces, and the fixturing and unfixturing of the pieces can take substantial time and effort.

Because of these delays and problems associated with moving in-line parts to CMMs for coordinate measurement, an even more recent trend has been to perform coordinate measurement while workpieces remain fixtured in a machine tool. In some cases, non-contact methods, such as laser scanning are used. In other examples, contact methods are used, in which the machine tool is outfitted with a touch sensor and is operated in a manner similar to a CMM to perform measurements on the workpiece. Because a CMM requires a large capital investment, the use of an existing machine tool for coordinate measurement can be desirable in many cases.

Historically, some limited gathering of dimensional data has been performed on numerical control (NC) machine tools using short, preprogrammed measurement commands. For example, Renishaw® macros running on a machine tool controller can take certain fairly simple measurements of features on workpieces. The number and types of measurements available by calling on Renishaw® macros are limited to fairly basic part investigations such as measuring a bore diameter and center location using a 3-point or a 4-point bore measurement. Some Computer Aided Design and Computer Aided Manufacture (CAD/CAM) Applications provide commands in a machine tool program that initiate the preprogrammed measurement commands (e.g., call Renishaw® macros).

A coordinate measurement software package developed by Xygent, titled XactCNC, is able to control a machine tool to gather sophisticated coordinate measurement data. In a manner similar to the CMM 104 and the CMM application running on the computer 102 described above in association with FIG. 1, XactCNC operates through the execution of a program on a computer to send commands to a measurement device. Unlike the system shown in FIG. 1, which can only send comments to a CMM, XactCNC additionally is able to send machine tool commands to a machine tool controller so that a machine tool can perform coordinate measurements.

A typical XactCNC system 200 is illustrated in FIG. 2, including a machine tool 202 outfitted with a contact probe 204. A computer 206, executing a coordinate measurement program, controls the machine tool 202 to move the probe 204 along a measurement path for performing coordinate measurements of a workpiece 208. The XactCNC package is executed on the computer 206 to translate a single command of a CMM program into a single command for a machine tool controller 210. Via a communication cable 212, the machine tool command is transmitted to the machine tool controller 210 to effect a movement or a measurement. After the movement or the measurement, data is fed back to the computer 206 via the communication cable 212. XactCNC then analyzes the returned data, determines a subsequent CMM program command, translates the CMM program command into a machine tool command, and communicates the machine tool command to the machine tool controller 210. XactCNC is able to send comments to the machine tool controller by substituting a machine tool device driver for a CMM device driver. The machine tool controller 210 acts in a passive manner in that the control program is remotely executed on the computer 206. Commands are communicated from the computer 206 to the machine tool controller 210 throughout the execution of the program, sometimes as often as every command. Similarly, data generated on the machine tool controller 210 is communicated to the computer 206 throughout the execution of the program, sometimes in response to each measurement. In this manner, one instance of the XactCNC software controls one machine tool to gather coordinate measurements.

SUMMARY

In one illustrative embodiment, a method comprises an act of generating, from a dimensional metrology program, a machine tool program including instructions to control a machine tool to perform coordinate measurements. The machine tool program is executable on a machine tool controller.

In another illustrative embodiment, a system comprises a program generator to generate, from a dimensional metrology program, a machine tool program including instructions to control a machine tool to perform coordinate measurements. The machine tool program is executable on a machine tool controller.

In a further embodiment, a computer-readable medium is provided having instructions stored thereon that, as a result of being executed by a computer, instruct the computer to perform a method. The method comprises an act of generating, from a dimensional metrology program, a machine tool program including instructions to control a machine tool to perform coordinate measurements. The machine tool program is executable on a machine tool controller.

In another embodiment, a system comprises means for generating a machine tool program from a dimensional metrology program. The machine tool program includes instructions to control a machine tool to perform coordinate measurements, and the machine tool program is executable on a machine tool controller. The system also comprises a communication module to communicate the machine tool program to the machine tool controller.

In a further embodiment, a method comprises acts of generating a machine tool program that includes instructions to control a machine tool to perform coordinate measurements, and analyzing coordinate measurement data generated by execution of the machine tool program using dimensional metrology analysis. The machine tool program is executable on a machine tool controller.

In another embodiment, a system comprises a program generator to generate a machine tool program including instructions to control a machine tool to perform coordinate measurements. The machine tool program is executable on a machine tool controller. The system also comprises a dimensional metrology analysis module to analyze coordinate measurement data generated by execution of the machine tool program.

In a further embodiment, a computer-readable medium is provided having instructions stored thereon that, as a result of being executed by a computer, instruct the computer to perform a method. The method comprises acts of generating a machine tool program including instructions to control a machine tool to perform coordinate measurements, and analyzing coordinate measurement data generated by an execution of the machine tool program using dimensional metrology analysis. The machine tool program is executable on a machine tool controller.

In another embodiment, a system comprises means for generating a machine tool program including instructions to control a machine tool to perform coordinate measurements. The system also comprises a dimensional metrology analysis module to analyze coordinate measurement data generated by an execution of the machine tool program. The machine tool program is executable on a machine tool controller.

In a further embodiment, a method comprises an act of generating, from a dimensional metrology program, a self-contained machine tool program that is executable on a machine tool controller to perform coordinate measurements without interaction with a program generator.

In a further embodiment, a method comprises an act of generating, from a dimensional metrology program, a machine tool program including instructions to control a machine tool to perform coordinate measurements. The act of generating is performed independently from any measurement data received from a machine tool controller.

In another embodiment, a method comprises an act of generating, from a dimensional metrology program, a machine tool program including instructions to control a machine tool to perform coordinate measurements. The method also comprises an act of providing at least one indicator within the machine tool program to be used by a dimensional metrology analysis module to analyze data generated by execution of the machine tool program.

In a further embodiment, a computer-readable medium is provided having instructions stored thereon that, as a result of being executed by a computer, instruct the computer to perform a method. The method comprises an act of generating, from a dimensional metrology program, a machine tool program including instructions to control a machine tool to perform coordinate measurements. The method also comprises providing at least one indicator within the machine tool program to be used during dimensional metrology analysis to analyze data generated by execution of the machine tool program.

In another embodiment, a system comprises a program generator to generate, from a dimensional metrology program, a machine tool program including instructions to control a machine tool to perform coordinate measurements. The machine tool program comprises means for indicating to a dimensional metrology analysis module the type of analysis to be performed.

In a further embodiment, a method comprises an act of using an inspection planning tool to generate a dimensional metrology program. The method also comprises an act of generating, from the dimensional metrology program, a machine tool program including instructions to control a machine tool to perform coordinate measurements.

In another embodiment, a method comprises an act of executing a machine tool program including instructions to control a machine tool to perform coordinate measurements to produce coordinate measurement data. The method also comprises analyzing the coordinate measurement data with a dimensional metrology analysis module. The method further comprises generating an additional machine tool program to perform one or both of machining and coordinate measurement.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
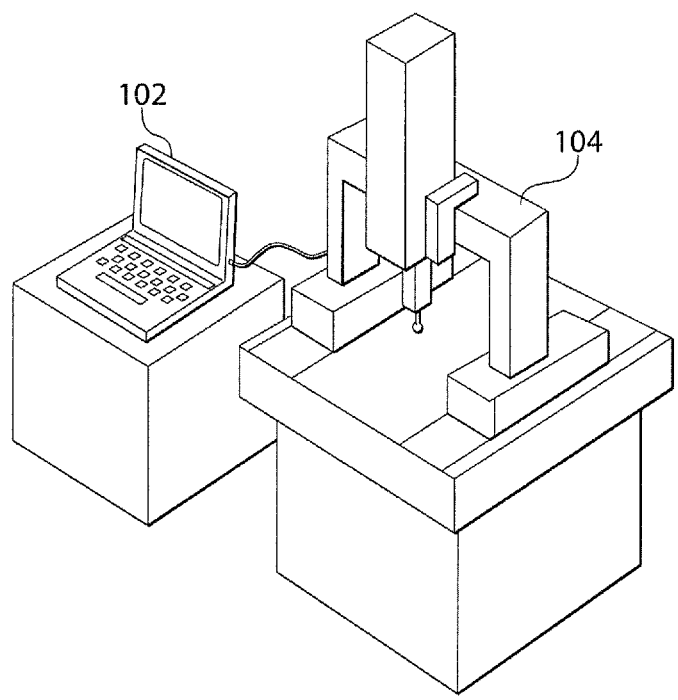
FIG. 1 is a perspective view of a prior art coordinate measurement machine.
Figure 2:
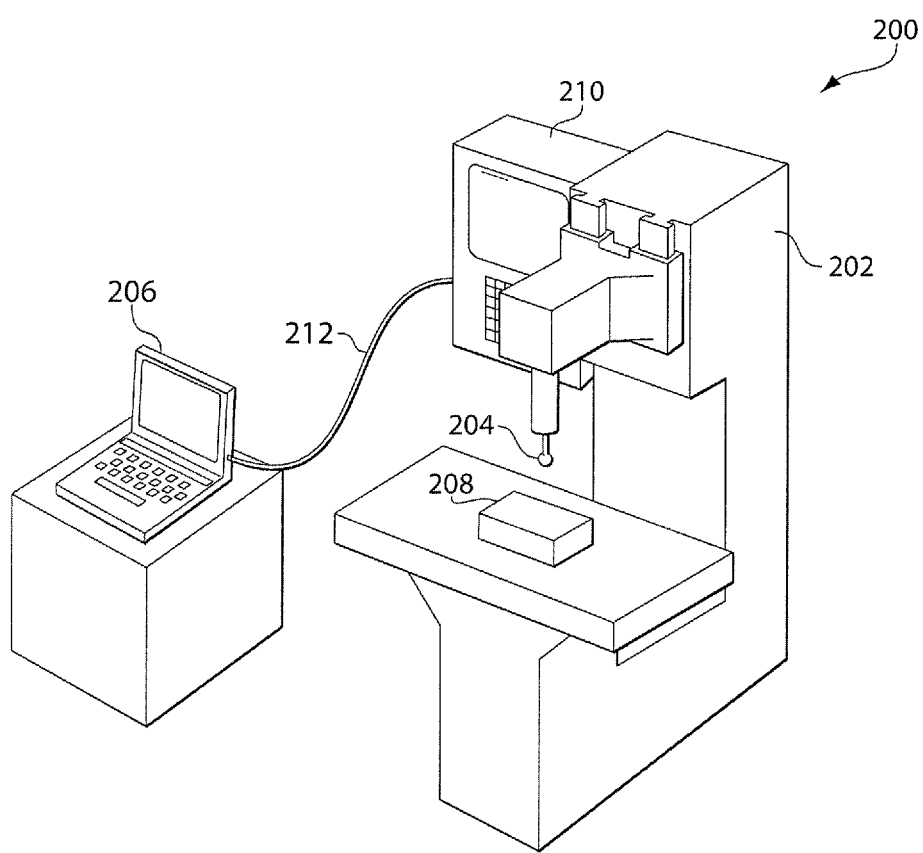
FIG. 2 is a perspective view of a prior art machine tool outfitted with a contact probe.

This invention is not limited in its application to the details of the embodiments set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Historically, the measurement capabilities of NC machine tools have been restricted to measurements performed by macros on the machine tool controller. The lack of processing power on machine tool controllers has significantly limited the types of measurements that can be performed.

Although XactCNC addresses this issue by allowing for more sophisticated measurement, and by using dimensional metrology analysis to analyze coordinate measurement results, the measurement process employed by XactCNC is time-consuming due to the interactive communications between the machine tool controller and the computer on which the coordinate measurement program is executed. Performing analysis between each communication of a command also adds delay to the measurement process.

Additionally, dimensional metrology programming typically has been performed by specialists using specialized (e.g., proprietary) software applications. Machine tool operators typically are not accustomed to or comfortable with using such applications. Machine tool operators, typically are, however, accustomed to using machine tool controller languages such as those that use G and M codes and/or the proprietary controller codes of machine tool controller manufacturers. Thus, a typical machine tool operator is more comfortable modifying a machine tool program on a machine tool controller using G and M codes than using dimensional metrology programming on a computer. A drawback of known systems such as XactCNC running on a computer is that the machine tool operator cannot locally modify the machine tool controller using G and M codes, but is forced to use dimensional metrology software running on the computer.

Embodiments of the invention disclosed herein are directed to methods and systems of controlling machine tools to gather coordinate data for dimensional metrology investigations. In one embodiment, a program generator generates a machine tool program using a dimensional metrology program as input. The generated machine tool program is coded in a language understood by the machine tool controller, for example, G and M codes. The generated machine tool program is executable on the machine tool controller such that once the machine tool program is present on the machine tool controller, the program generator is not required for program execution. During execution, the machine tool controller controls the machine tool, which may be outfitted with a measurement sensor, and acquires and/or communicates measurement data.

A typical machine tool controller comprises a dedicated computer located at a machine tool. The machine tool controller executes machine tool programs and translates the programs into command signals and sends the command signals to motor drivers or motors. Various position measurement sensors, transducers and counters return measurement signals to the machine tool controller. One example machine tool controller and machine tool combination is the General Electric Fanuc Automation CNC Unit, Series 16i used on a Miigata SPN40 horizontal milling machine.

As used herein, a "program" is a set of instructions. Such instructions may be defined by computer-readable instructions tangibly embodied on a computer-readable medium, for example, a non-volatile recording medium, an integrated circuit memory element, or a combination thereof. Such instructions, as a result of being executed by a computational device such as a computer, machine tool controller or other type of device, instruct the device to perform one or more operations. Such instructions may be written in any of a plurality of programming languages, for example, Java, Visual Basic, C, C#, or C++, Fortran, Pascal, Eiffel, Basic, COBOL, etc., or any of a variety of combinations thereof. Hie computer-readable medium on which such instructions are stored may reside on one or more of the components of the systems described below, and may be distributed across one or more of such components. The computer-readable medium may be transportable such that the instructions stored thereon can be loaded onto any computational device to implement aspects of the present invention discussed herein. In addition, it should be appreciated that the instructions stored on the computer-readable medium, described above, are not limited to instructions embodied as part of an application running on a host computer. Rather, the instructions may be embodied as any type of computer code (e.g., software or microcode) that can be employed to program a processor to implement aspects of the present invention.

As used herein a "machine tool program" is a program that, when executed by a machine tool controller or other suitable device, controls the operation of a machine tool. As used herein, a "dimensional metrology program" is a program that, when executed by a computer or other suitable device, directs the acquisition of coordinate measurements for dimensional metrology analysis. Dimensional metrology programs include programs configured to control the acquisition of measurements on a CMM, for example programs generated by PC-DMIS® available from Wilcox Associates.

Coordinate measurements may be analyzed using dimensional metrology analysis. Dimensional metrology analysis modules typically use overdetermined objective functions to fit curves or surfaces to coordinate measurement data. For example, a least squares regression algorithm or other regression algorithm may be used to fit a circle to a large number of measured data points. Often, the algorithms are tested in compliance with the American Society of Mechanical Engineers (ASME) B89.4.10-2000 standard (Methods for Performance Evaluation of Coordinate Measuring System Software) and/or the European Physikalisch-Technische Bundesanstalt (PTB) standard for measurement of features using a method of least squares.

Figure 3:
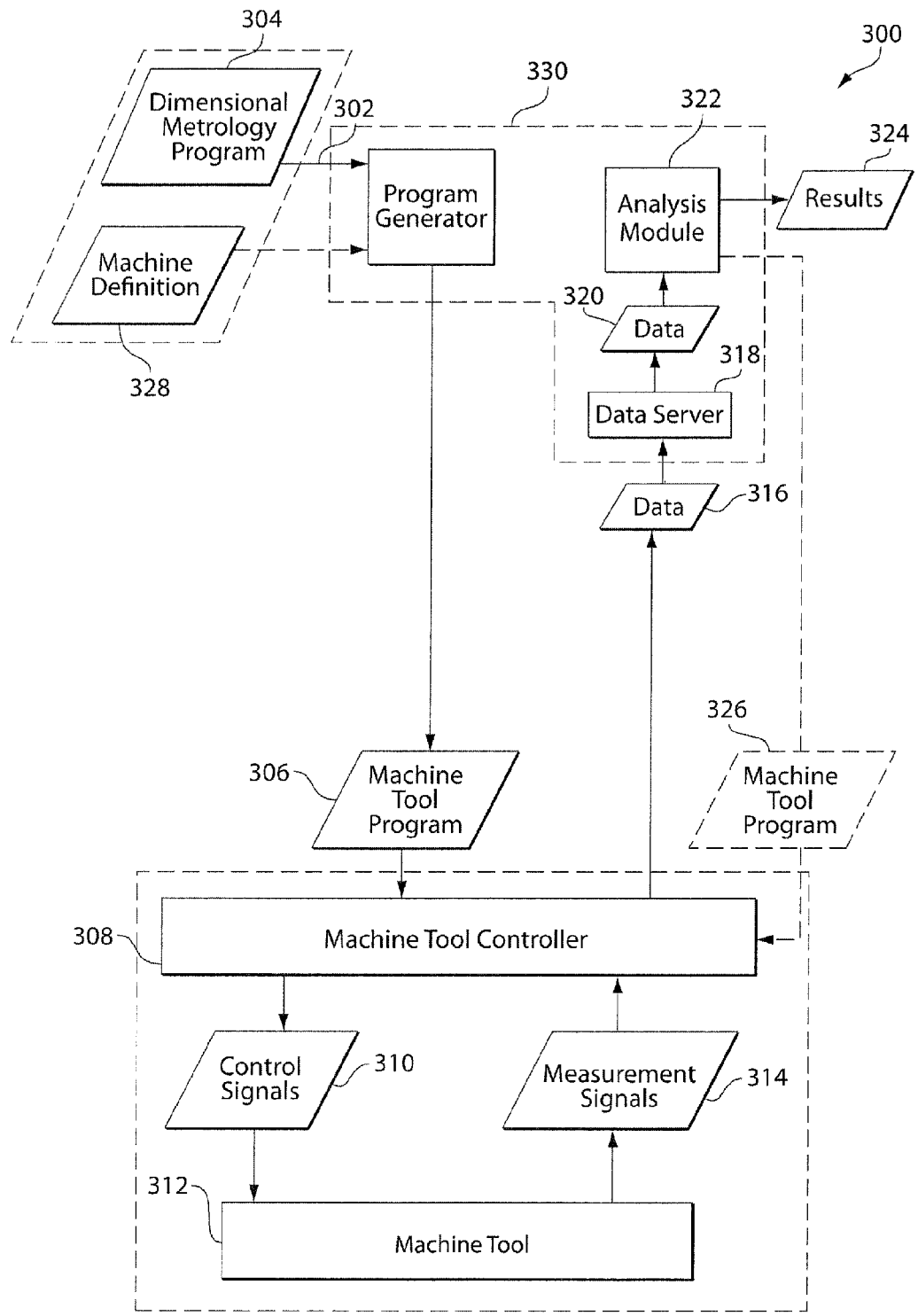
FIG. 3 is a data flow diagram illustrating an example of a system to generate and execute a machine tool program and analyze data according to an aspect of the invention.

FIG. 3 is a schematic representation of one embodiment of a system 300 for using a machine tool to perform coordinate measurements. Program generator 302 accepts a dimensional metrology program 304 as input and generates a machine tool program 306 as output. The program generator 302 may accept the dimensional metrology program 304 from any suitable source, such as coordinate metrology applications or directly from a storage medium. It should be appreciated that the source of the dimensional metrology program 304 is not intended to be limiting. In some embodiments, the program generator 302 and the source of the dimensional metrology program may be implemented on a single computer. In other embodiments, the program generator 302 may be implemented on a computer separate from the source and may accept inputs via various communication devices or storage mediums.

In some embodiments, the program generator 302 also accepts a machine definition 328 as input. The machine definition 328 provides information about the machine tool that the generated machine tool program 306 is intended to control. Machine definitions are described in more detail below with reference to FIGS. 5 and 6. The dimensional metrology program 304 and the machine definition 328 may be received as an integral unit, or may be received separately. Multiple dimensional metrology programs and/or machine definitions may be stored on system 300 such that a dimensional metrology program and/or a machine definition may be selected from lists of dimensional metrology programs and machine definitions.

The program generator 302 processes the dimensional metrology program 304 to generate a machine tool program defined to perform a measurement path on a machine tool, as discussed in more detail below with reference to FIG. 4. The measurement path defined by the generated machine tool program 306 may be a translation of a measurement path defined by the dimensional metrology program 304.

The machine tool program 306 may be communicated to a machine tool controller 308 by any suitable method, for example, by using a method for which the machine tool controller 308 is configured. For example, any of a variety of communication protocols, such as an Ethernet protocol, may be used to communicate the machine tool program 306 to the machine tool controller 308. The machine tool program 306 may be communicated to the machine tool controller 304 on a network. As used herein, a "communications network" or a "network," is a group of two or more devices (e.g., devices on which the machine tool controller 308 and the program generator 302 reside) interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It is to be appreciated that the one or more segments of transmission medium used to communicate the machine tool program 306 to the machine tool controller 308 is not intended to be limiting. In some embodiments, a computer numerical control (CNC) system, a direct numerical control system, or a distributed numerical control (DNC) system may be used to communicate with machine tool controllers and/or control machine tools.

In one embodiment, the machine tool program 306 is self-contained on the machine tool controller 308. In this manner, further communications from the program generator 302 may not be required after the machine tool program 306 is communicated to the machine tool controller 308. Such a one-time communication may permit faster execution of the machine tool program 306. Additionally, limited communications requirements may free up the program generator 302 for other tasks.

In executing the machine tool program 306, the machine tool controller 308 provides control signals 310 to the machine tool 312 to perform coordinate measurements. The particular measurement path that the machine tool 312 carries out may not be identical to a measurement path that would be performed on a CMM controlled by the same dimensional metrology program 304 from which the machine tool program 306 was generated. During the performance of coordinate measurements, the machine tool controller 308 receives measurement signals 314 from the machine tool 312 and generates data 316 regarding the position of measurements made by a sensor. In some embodiments, the sensor may be a mechanical contact probe, and in other embodiments, the sensor may be an optical sensor, a capacitance sensor, an air flow sensor or any other suitable sensor. The data 316 resulting from the execution of the machine tool program 306 may be stored by the machine tool controller 308 and may be communicated to other system modules, such as a data server 318. It should be noted that the particular method used by the machine tool controller 308 to control the machine tool 312 and to acquire data 316 is not intended to limit the scope of the invention.

The data server 318 receives and manages the data provided by the execution of the machine tool program 306. The data server 318 may receive data 316 from numerous machine tool controllers concurrently or in sequence. In some embodiments, the data server 318 sends data 320 to an analysis module 322 for data analysis. The data server 318 may automatically initiate the communication of data 320 and/or the analysis of the data 320, or the data server 318 may be prompted by an operator to initiate such actions. A data server 318 is not required, and in some embodiments, data 316 is communicated from the machine tool controller 308 to the analysis module 322 without an intermediary data server 318.

The analysis module 322 may be configured such that after performing various analyses, it outputs the analysis results in any suitable manner. The type of analysis to be performed and the verification of certain parameters may be specified by indicators that are present within the data 320 and/or associated with the data 320. A description of indicators is provided below in association with FIG. 5.

In some embodiments, results 324 of the analysis may be used to generate modified or new machine tool programs. After a machine tool program has been executed and the data 320 has been analyzed, further machining and/or dimensional investigation may be desired. Additional or modified machine tool programs 326 comprising machining and/or measurement commands may be communicated to the machine tool controller 308. In some embodiments, an additional machine tool program 326 is communicated directly from the analysis module 322, and in other embodiments the additional machine tool program 326 is communicated via the program generator 302 and/or the data server 318. Such a system architecture may permit closed-loop manufacturing in that machining can be automatically performed in response to dimensional investigations and analysis, and the loop operations may be repeated without removing the workpiece from the machine tool. In other embodiments, the modules described with reference to FIG. 3 may be integrated with components of a CAM application, such that a closed-loop cutting/measuring system may be implemented.

It is contemplated that several of the described modules may be implemented on a machine tool controller itself if such machine tool controller is configured with adequate processing capabilities. For example, a dimensional metrology program may be input to such a machine tool controller and program generation may occur on the machine tool controller. In other embodiments, the analysis module may be entirely or partially integrated within a control panel that includes the machine tool controller if such control panel is adequately configured. Thus, if the machine tool controller is configured with a suitable operating system and adequate processing capabilities, the program generator module and/or the analysis module may be integrated within a machine tool controller control panel.

System 300 and components thereof (e.g., 302, 304, 306, 308, 318, 322, 326) may be implemented using software (e.g., C, C#, C++, Java, or a combination thereof), hardware (e.g., one or more application-specific integrated circuits), firmware (e.g., electrically-programmed memory) or any combination thereof. One or more of the components of system 300 may reside on a single system 330 (e.g., a single computer), or one or more components may reside on separate, discrete systems. Further, each component may be distributed across multiple systems, and one or more of the systems may be interconnected.

Further, on system 300, each of the components may reside in one or more locations on system 300. For example, different portions of such components may reside in different areas of memory (e.g., RAM, ROM, disk, etc.) on system 300. System 300 may include, among other components, a plurality of known components such as one or more processors, a memory system, a disk storage system, one or more network interfaces, and one or more busses or other internal communication links interconnecting the various components. System 300 may be implemented on a computer system described below in relation to FIGS. 11 and 12.

System 300 is merely an illustrative embodiment of a system operable to use a machine tool as a coordinate measurement device. Such an illustrative embodiment is not intended to limit the scope of the invention, as any of numerous other implementations of such a system, for example, variations of system 300, are possible and are intended to fall within the scope of the invention. None of the claims set forth below are intended to be limited to any particular implementation of such a system, unless such claim includes a limitation explicitly reciting a particular implementation.

By providing a program that runs on the machine tool controller itself, as opposed to a remotely-executed program (e.g., a program executed remotely by a computer), machine tool operators can more effectively operate the machine tool and make adjustments to the control program as they see fit, for example, using G and M codes. The added flexibility of allowing the machine tool program to be adjusted locally on the machine tool controller by an experienced machine tool operator may be particularly desirable when measuring complex parts.

The machine tool program may be generated at a location remote from the machine tool and the machine tool controller, for example, by an application residing on a remotely located computer. Such application may be configured to minimize the number of communications made to the machine tool controller before or during execution of the machine tool program. In fact, in some embodiments, the application may communicate information to the machine tool controller only once, when it communicates the machine tool program. In other embodiments, there may be a limited number of communications, for example, one communication of the machine tool program along with transmissions of tool-offset updates, as is described in more detail below.

A machine tool program that is executed on the machine tool controller also may allow for a faster measurement process than the XactCNC system because back and-forth communication between the application and the machine tool controller is not required. The frequent communications of XactCNC cause significant delays if each communication is time-consuming. In embodiments of the present invention, communications may take place across complex networks or the Internet without concern for communication times. Further, the separation of the machine tool program from data analysis reduces or eliminates the wait times that would occur if analysis were being performed on a remote device to determine a subsequent command to be executed by the machine tool controller. In XactCNC, certain machine tool commands cannot be generated until measurement data has been received and analyzed. In embodiments of the present invention, such analysis is not required for program generation. In one embodiment, a program generator generates a machine tool program from a dimensional metrology program without performing an analysis of measurement data as part of generating the machine tool program.

In an alternative embodiment of the invention, the machine tool program is capable of being remotely executed on a computer that communicates with a machine tool controller. In such an embodiment, a sufficient number of commands may be placed in a queue on the machine tool controller so that the machine tool controller can perform lookahead functions.

In one embodiment, the data provided by the machine tool controller is received and managed by a data server. The data server may receive measurement data from multiple machine tools. In some embodiments, the measurement data from multiple machine tools may all be related to a single workpiece that progressed through a sequential transfer line. In other embodiments, the measurement data from multiple machine tools may be related to separate workpieces on separate machine tools. The data server may also be configured to manage the analysis of separate sets of data such that one analysis application is capable of analyzing measurement data from multiple machine tools. Of course, in some embodiments, the data server or the analysis application may be dedicated to one machine tool. In other embodiments, several data servers and/or several analysis applications may be associated with multiple machine tools. Additionally, the data server and the analysis application are not required to reside on a single computer, and various components may be distributed among one or more computer systems.

The data server and/or the program generator may be located remotely from a machine shop workspace (i.e., the shop floor), for example, on one or more computers. By locating such computers away from the shop floor, shop floor space can be saved, changes to the shop floor configuration can be avoided, and the computers are not subjected to the shop floor environment. Additionally, whereas operating the program generator might become the default responsibility of the machine tool operators if the computers were positioned on the shop floor, remote positioning can remove this default responsibility. Thus, the machine tool operator can focus effort on operating the machine tool.

Figure 4:
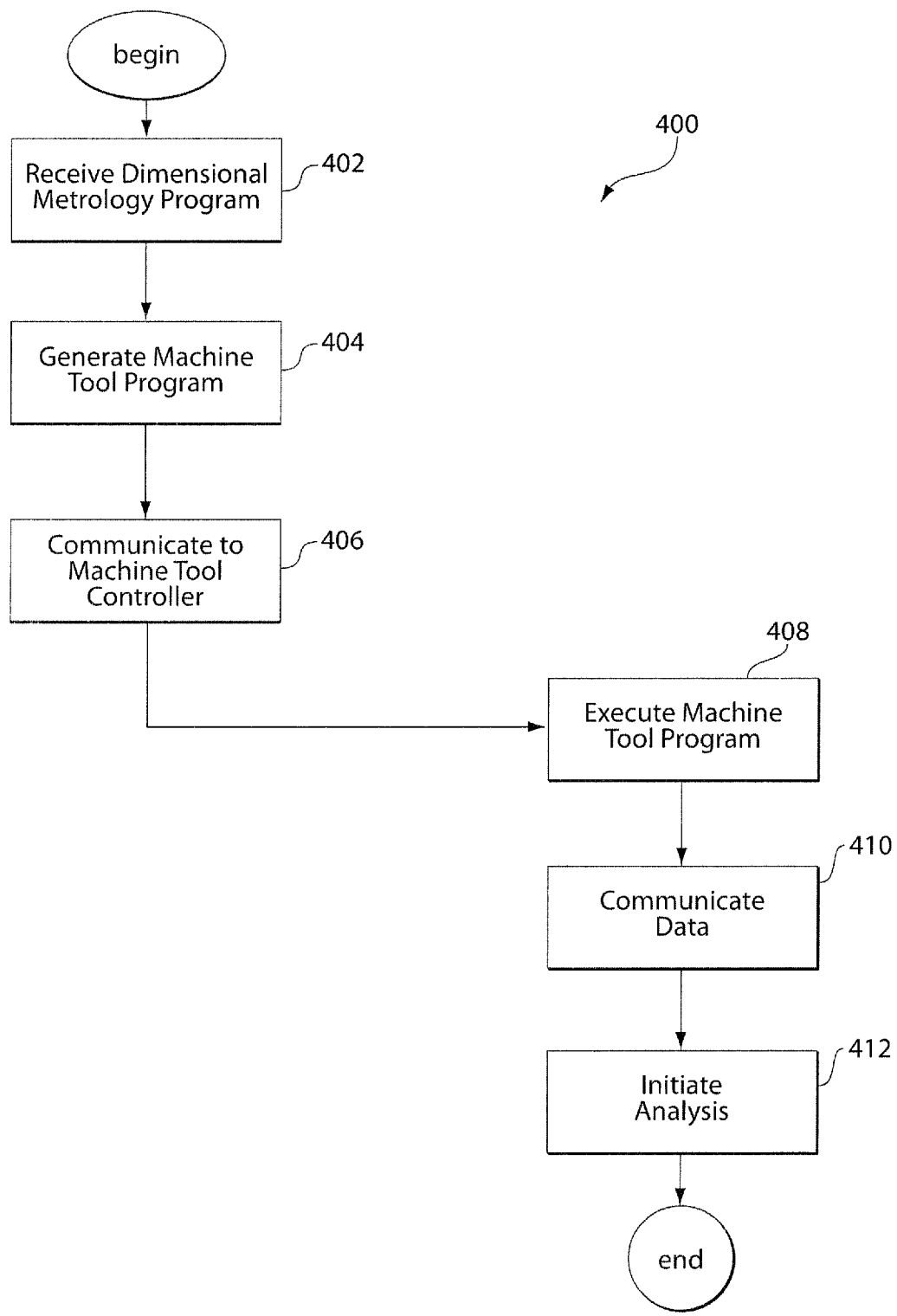
FIG. 4 is a flowchart illustrating an example of a method of programming a machine tool controller according to an aspect of the invention.

Although the methods and systems described herein are not intended to be limited to a particular sequence of acts, one example of a method 400 for generating a machine tool program using a dimensional metrology program and communicating the machine tool program to a machine tool controller is illustrated in FIG. 4.

In an act 402, a dimensional metrology program is received as input. It is contemplated that the dimensional metrology program may have been created separately and stored before being received as input. For example, the dimensional metrology program may be a program that was previously generated, for example, by a dimensional metrology application, and stored on a storage medium.

In act 404, the dimensional metrology program is used in generating a machine tool program, such as a numeric control program (NC program) or other type of machine tool program. Act 404 may comprise translating the dimensional metrology program to a machine tool program. Certain commands may be removed from the dimensional metrology program during act 404, such as various interactive functions or commands. Interactive functions are found in dimensional metrology programs because returned data is used to determine subsequent commands. In embodiments of the present invention, the entire or substantially the entire machine tool program is communicated to the machine tool controller in one communication and the program generator and the machine tool controller do not interact during execution of the machine tool program. For example, the program generator and the machine tool controller do not interact to determine subsequent commands during machine tool program execution. Examples of commands that may be removed include: interactive alignments; find hole; relative measurements; edge find; point find; auto-relative measure; branching logic; and so on. Some interactive functions or commands may be left in the program, and updates to various parameters, such as a tool offset value, may occur during execution.

Often, the dimensional metrology program includes both move commands and probing cycle commands. To translate the dimensional metrology program to the machine tool program, the dimensional metrology move commands may be mapped to NC move commands and the dimensional metrology probing cycle commands may be mapped to NC probing subroutines. As discussed above, certain dimensional metrology commands, particularly interactive commands, may not be translated and included in the machine tool program. Also, additional commands not found in the dimensional metrology program may be inserted in the machine tool program. Indicators also may be placed within the machine tool program or associated with the machine tool program as part of act 404 or as a separate act.

A dimensional metrology move command typically defines a movement of a sensor from a current location to a target location at a specified speed. A dimensional metrology move command may be translated to an NC move command by providing NC commands that define the same path at the same speed. In certain embodiments, speeds and/or paths may be altered to account for characteristics of the machine tool on which the machine tool program is intended to be used.

A dimensional metrology probing cycle typically includes several parameters including: pre-hit; search distance; retract distance; a nominal target point's coordinates; and a nominal target vector. The dimensional metrology probing cycle may be mapped to an NC probing subroutine. For example, a dimensional metrology probing cycle can be mapped to an NC Skip Move command. In a Skip Move command, the sensor is commanded to move to a target point that is predicted to be beyond a surface to be measured. When the sensor triggers, it signals the machine tool controller's Skip Input command, which stops the sensor movement. The position of the sensor (determined by the measured position of the machine tool axes) at the point at which the move was interrupted defines the surface measurement. The position data returned by the Skip Move command may be adjusted for the sensor offset or other calibration factors.

Because machine tool controllers acquire the positions of the machine axes differently than CMMs, commands that allow for dual-hit probing also may be included in the machine tool program. Machine tool controllers determine the position of the machine tool axes from their servo loops. The servo loops have a loop time that may produce some ambiguity as to the axes position at the time of sensor triggering. Once a surface has been located using a fast probing speed, it may be desirable to sensor the surface a second time at a slower speed to reduce any errors. Renishaw® probing macros include this option, and commands that execute these macros may be included in the machine tool program. Other, specialized routines also may be written for particular configurations. It is important to note that while several NC commands and NC subroutines have been mentioned in the above description, the methods and systems described herein can be applied to any suitable machine tool language and/or control system.

Examples and descriptions of probing macros for machine tools can be found in various software programming manuals. For example, the Inspection Plus Software Programming Manual by Renishaw® provides descriptions, definitions and examples of measurement cycles. A measure command is included as part of the Siemens 840D controller set of commands. NC codes can be found in various NC controller manufacturer documentation, one example of which is the Operator's Manual for a GE Fanuc Controller, Series 16i.

In addition to generating a machine tool program, act 404 may insert pass-through indicators within the machine tool program for various purposes. As described below, pass-through indicators can aid an analysis module in its analysis of the data. The pass-through indicators may be inserted or attached to a machine tool program during act 404 and pass through the machine tool controller without being used or altered. As part of an act 410, the pass-through indicators may be communicated to a data server or an analysis module where they may be used in data management and/or data analysis.

Other inputs may be received before or during act 404. For example, as discussed below with reference to FIG. 5, a machine tool definition may be provided.

The generated NC program is communicated (e.g., posted or downloaded) to an NC controller in act 406. This communication need not occur immediately, in fact, the machine tool program can be stored indefinitely before being communicated to the machine tool controller. The communication of the NC program may start after the entire NC program has been generated, or the communication of some program portions may occur concurrently with the generation of other program portions.

In some embodiments, there is one communication of the entire NC program to the NC controller. The NC program may be executed on the NC controller in an act 408 without further communication to or from the NC controller. In other embodiments, while the NC program is executing on the NC controller or paused during execution, certain updates or other data may be communicated to the NC controller. For example, the NC program may require updated tool offset data while the NC program is being executed. During execution, the NC program may be paused and a short update program may be executed. The execution of a program on a machine tool controller (machining or otherwise) typically includes an operator to start the process. In some cases, however, execution may be initiated automatically.

As the machine tool program progresses through a measurement path, data is generated on the machine tool controller. In act 410, the data may be communicated, for example, to a computer or a storage medium. As described below in association with FIGS. 8 and 10, the data may be communicated to a data server module or other location for data management. The communication of the data may be achieved with any suitable method.

Raw dimensional data from the machine tool controller may be useful on its own, but it may be desirable to use dimensional metrology analysis to analyze the data. In act 412, analysis of the data is initiated. The data analysis may be initiated by a server module, or the communication of the data to an analysis module may automatically initiate the analysis.

While the embodiments associated with FIG. 4 have been described in terms of a method, embodiments of the invention also may take the form of a system or a computer-readable medium. For example, a computer-readable medium, such as a hard drive, may have computer-readable signals stored thereon that define instructions, which as a result of being executed by a computer, instruct the computer to perform some or all of the acts described in connection with method 400. The machine tool program be initiated by input received from an operator, or in some embodiments, the machine tool program may be initiated automatically.

Method 400 may include additional acts. Further, the order of the acts performed as part of method 400 is not limited to the order illustrated in FIG. 4 as the acts may be performed in other orders, and one or more of the acts of method 400 may be performed in series or in parallel to one or more other acts, or parts thereof. For example, act 410 may start before act 408 has been completed.

Method 400 is merely an illustrative embodiment of generating a machine tool program from a dimensional metrology program. Such an illustrative embodiment is not intended to limit the scope of the invention, as any of numerous other implementations of such a method, for example, variations of generating a machine tool program, are possible and are intended to fall within the scope of the invention. None of the claims set forth below are intended to be limited to any particular implementation of such a method unless such claim includes a limitation explicitly reciting a particular implementation.

To facilitate a generation of a machine tool program using a dimensional metrology program, machine definitions may be used to define a particular machine tool or a particular type of machine tool. Each machine tool may be defined with values for a set of user-adjustable parameters, and the machine definition can be used in conjunction with a dimensional metrology program to generate a machine tool program.

Figure 5:
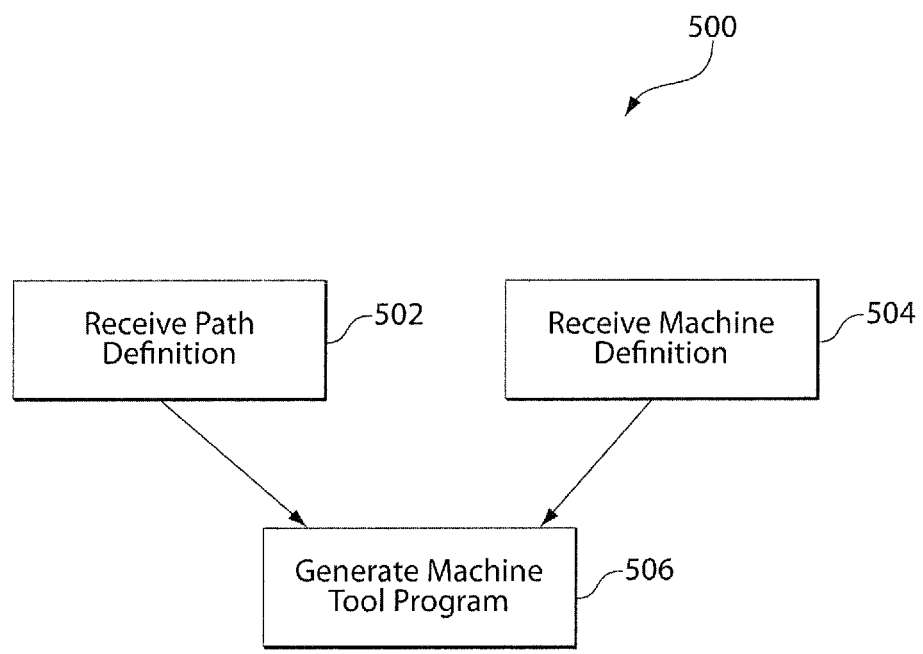
FIG. 5 is a flowchart illustrating an example of a method of generating a machine tool program from a dimensional metrology program according to an aspect of the invention.

FIG. 5 illustrates one embodiment of a method 500 of receiving inputs for performing act 404 of FIG. 4. A path definition and a machine definition are received by a program generator in act 502 and 504, and are used to generate a machine tool program in an act 506. A user may select the machine definition from a menu of previously defined machine definitions, or, in some embodiments, the user may provide the machine definition prior to program generation. The path definition may be defined by a dimensional metrology program such as a CMM program, or it may be defined by a computer-assisted drafting (CAD) file or application independent from a dimensional metrology program. The machine definition and the path definition may be received together as one act, or the machine definition and the path definition may be received separately as act 502 and act 504.

Figure 6:
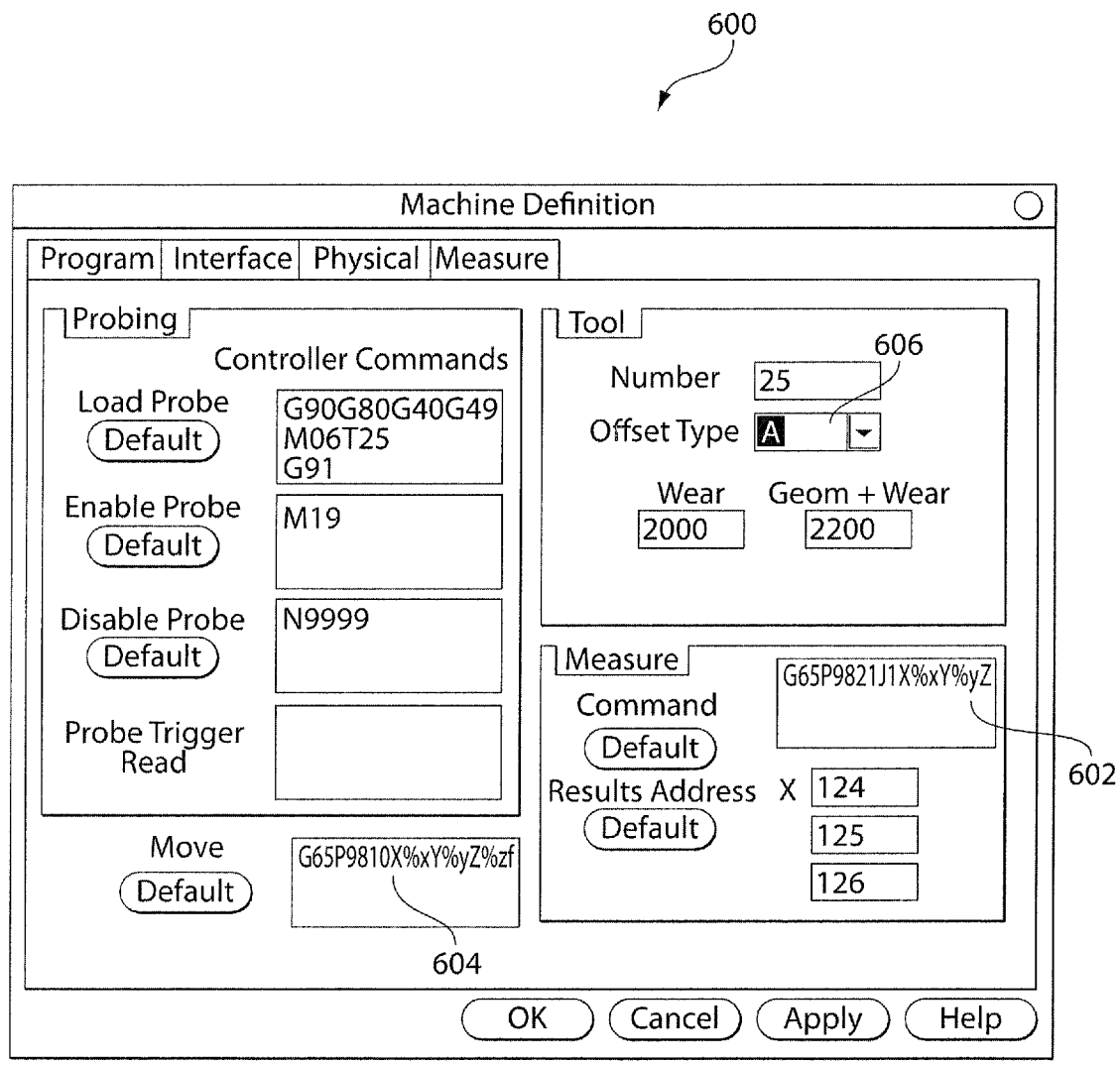
FIG. 6 is a screen shot illustrating an example of a graphical user interface to enable a user to create a machine definition according to an aspect of the invention.

An example of a graphical user interface (GUI) 600 for generating a machine definition is shown in FIG. 6. Once values have been entered for the various parameters, the machine definition may be used for program generation or stored in a machine definition file. Thus, the machine definition may be persisted and re-used any number of times to generate a machine tool program.

For example, a parameter for a measure command 602 may be provided with a parameterized string for the machine tool that is being defined, as illustrated in FIG. 6. Parameter 602 defines the command that is to be used in the machine tool program. The inputted value for the measure command parameter 602 may be a macro which allows substitution of the x, y, and z values when the machine tool program is being generated.

Similarly, a move command parameter 604 may define a move for the machine tool. A parameterized string may be entered as a value for the parameter 604 and the x, y, and z values may be substituted with target values from a dimensional metrology program during machine tool program generation.

Another example of a parameter that may be provided with a value for a particular machine or type of machine is tool offset type parameter 606. This parameter may enable the user to select from an absolute offset, an absolute-plus-wear offset, and an absolute-plus-wear-plus-geometry offset. The above parameters (measure, move and tool offset type) are presented by way of example only and are not intended to be limiting.

Figure 7:
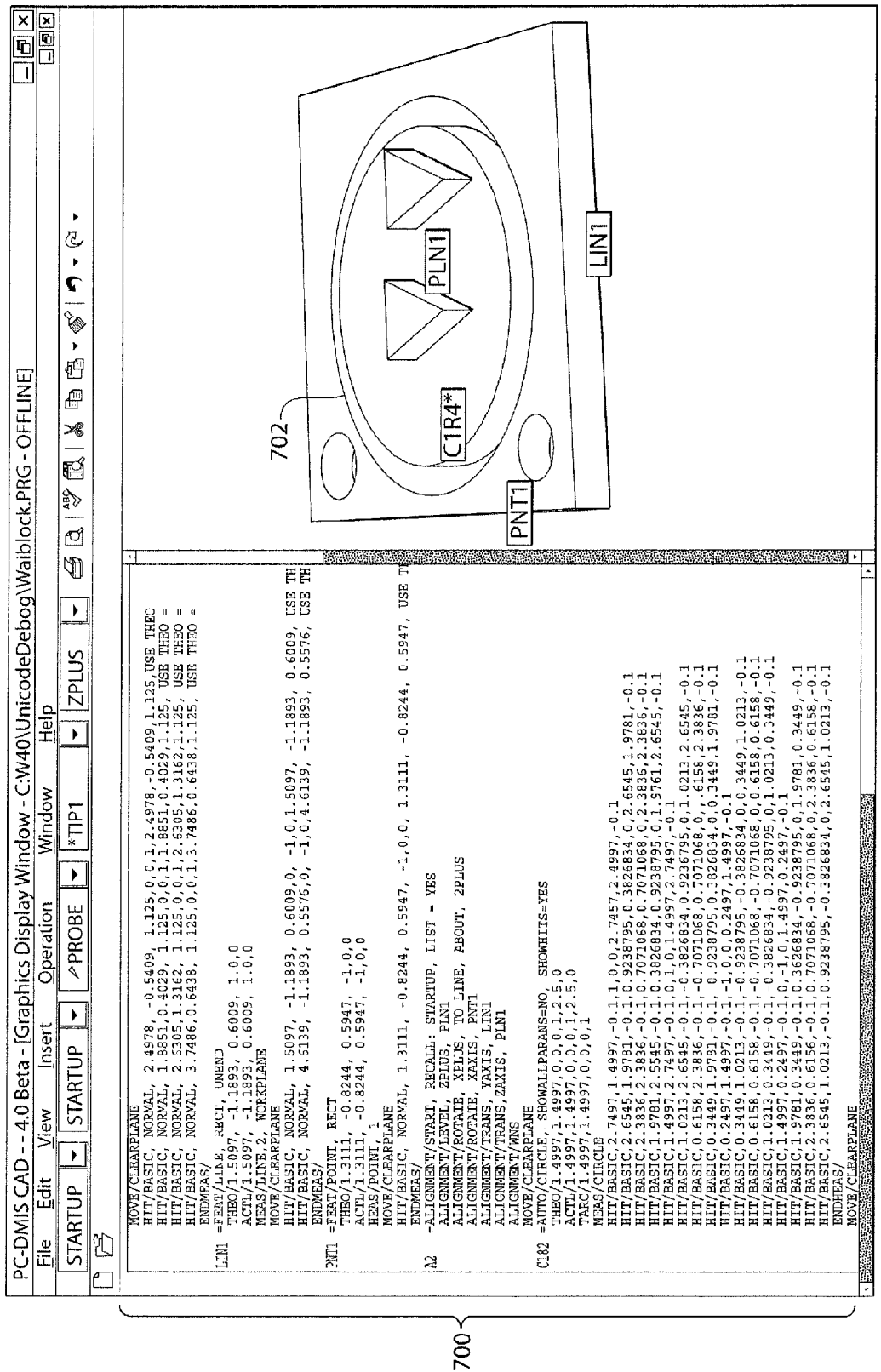
FIG. 7 is a screen shot of a user interface for developing a dimensional metrology program using a computer-assisted drafting model according to an aspect of the invention.

A screenshot of a portion of a dimensional metrology program 700 being developed from a CAD model using a dimensional metrology application is shown in FIG. 7. The user clicks on various features shown in a CAD drawing 702 and selects measurement requests. From the user inputs, a dimensional metrology program 700 is developed. This dimensional metrology program development can be achieved with various applications, of which PC-DMIS® is one example.

An additional act that may be used as part of a method to generate a machine tool program is the generation of a dimensional metrology program using an inspection planning tool (not shown). An inspection planning tool uses a set of data regarding a part to be machined and/or a set of instructions regarding which features of the part are to be measured. The data and/or instructions may take the form of a file, a database, or any other suitable set of data and/or instructions residing on a computer-readable medium. The inspection planning tool may be used before or during an act of generating a dimensional metrology program, and may be used to automatically generate dimensional metrology commands based on a CAD model and the data and/or instructions described above. The use of an inspection planning tool may reduce the amount of time used to generate dimensional metrology programs as compared to current dimensional metrology programming tools or manual techniques. The act of generating a dimensional metrology program using the inspection planning tool can be implemented on a system that is separate from the program generator or on a system that is integrated with the program generator.

Another act that may occur as part of a program generation act is the insertion or association of indicators (not shown) within the machine tool program. The indicators may be based on data included within the machine definition or the path definition, or the indicators may be separately received. A first subset of the indicators may be used by the machine tool controller to verify certain system parameters. A second subset of the indicators may be pass-through indicators that the analysis module can use for its data analysis. For example, a pass-through indicator may provide the data analysis module with information regarding what type of machine tool was used to gather the data. Another pass-through indicator may provide information as to which particular machine tool that was used. Indicators for the data analysis module also may be input to the data analysis module directly, or via other methods.

In other embodiments, an indicator may provide information to the machine tool controller to aid with verification of: the machine tool program identity; the work offset; feature identities (e.g., bore number one or edge number three); indexes of the number of point measurements for given features; and the measurement unit system (i.e., English versus metric). If various identities or other verification factors do not match, error codes may be generated by the data server module or the analysis module.

In another embodiment, indicators may be added by modifying the machine tool program. For example, a machine tool operator may insert an indicator into a machine tool program. When one of an analysis module and a data server received the indicator, it may initiate an update of the dimensional metrology program and/or the machine tool program. In some embodiments, the insertion of an indicator may result in the addition of a measurement of a feature to one or both of the programs. In some cases the update may be permanent, and in other cases it may be for a limited duration.

Figure 8:
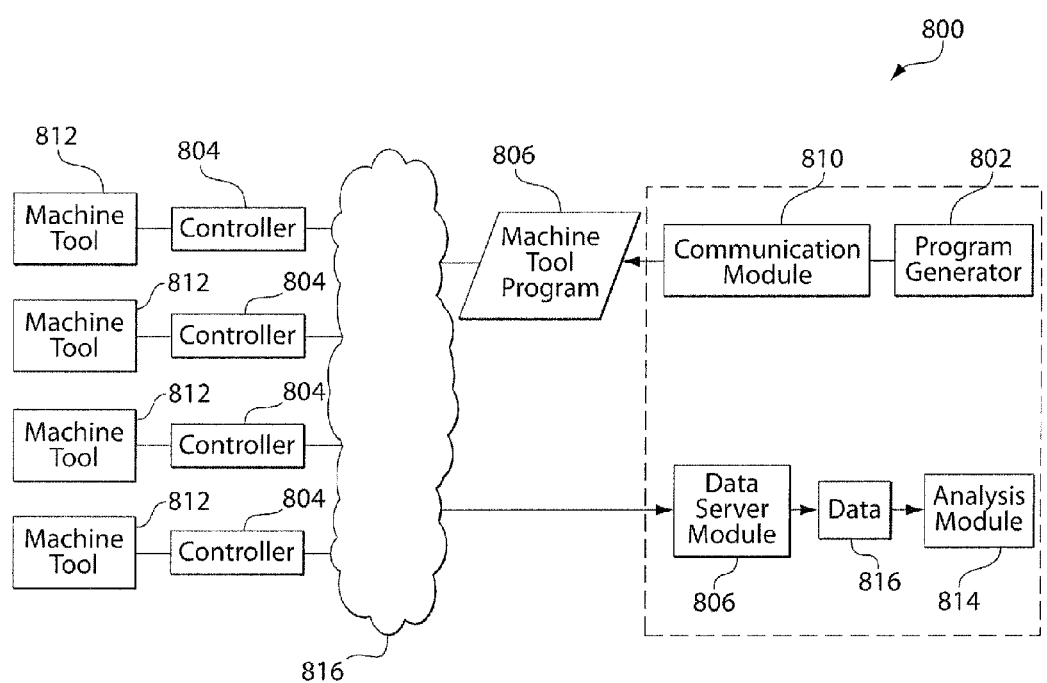
FIG. 8 is a block diagram illustrating an example of a system architecture to program a machine tool controller according to an aspect of the invention.

Some of the above-described methods and systems have features that allow for various system configurations when using more than one machine tool for coordinate measurement. One such configuration 800 is illustrated in FIG. 8 in which a program generator 802 communicates with multiple machine tool controllers 804, and the multiple machine tool controllers 804 communicate with a data server module 806.

Once a machine tool program 808 is generated, the program generator 802 may communicate the machine tool program 808 to one or more machine tool controllers 804 via a communication module 810. Both the machine tool program 806 and the machine tool controller 804 (or a machine tool 812) may be selected from a menu of options as described below with reference to FIG. 9. Data resulting from an execution of the machine tool program 806 on the machine tool controller 804 may be transmitted via the data server module 806 to an analysis module 814.

The data server module 806 is implemented on a computer or other appropriate computing device and can provide various services for the machine tool controllers 804 and/or the analysis module 814. For example, the data server module 806 may receive data 816 from the machine tool controllers 804 such that machine tool programs 806 can be executed concurrently on multiple machine tool controllers 804, and the resulting data can be managed in a central location, for example, on a single computer and/or using a single application. Such data may be transmitted across a network 816. The data server module 806 may manage the data to send one data set at a time to the analysis module 814. In this manner, it may be advantageous that only one analysis application is used to analyze data from multiple machine tools 812. A data set is any group of data points that is to be analyzed during an execution of the analysis application. For example, a data set may include data resulting from the execution of one machine tool program, or may include data resulting from multiple machine tool program executions on a single machine tool. In some cases, a data set may include data sent from multiple machine tools measuring a common workpiece or a common feature.

Figure 9:
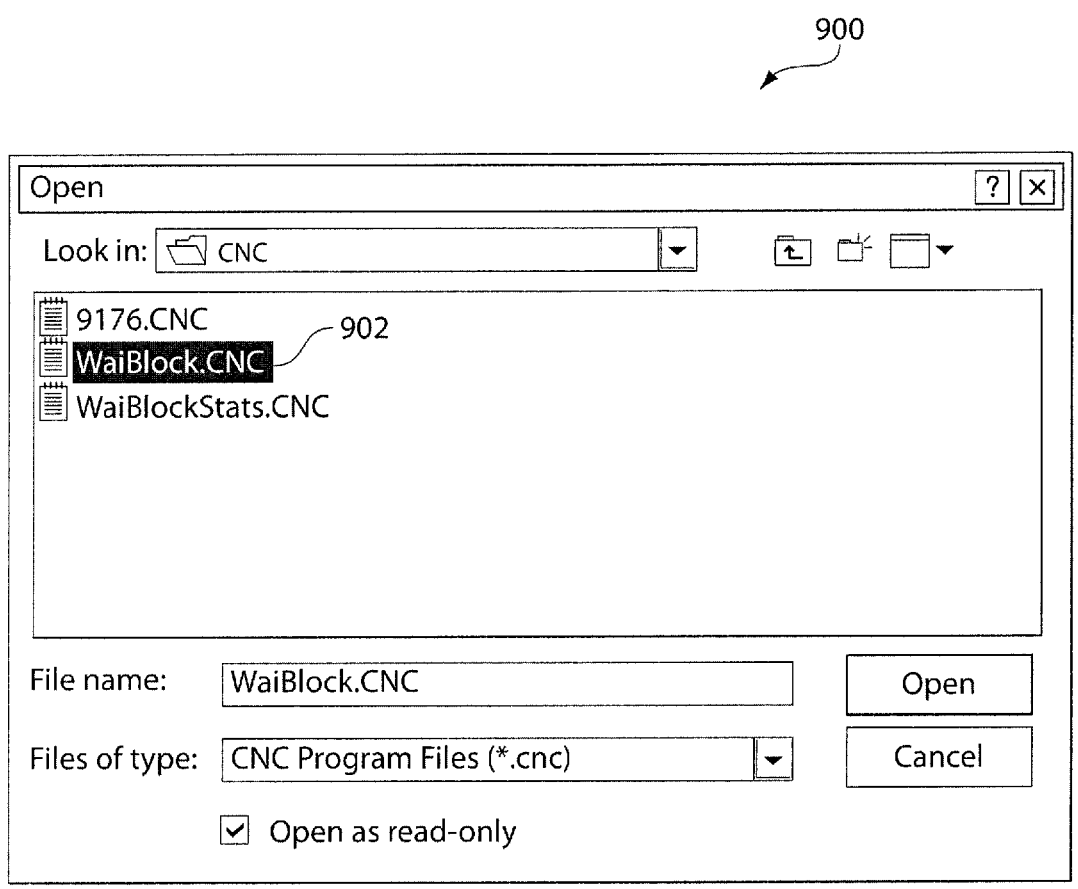
FIG. 9 is an example of a graphical user interface to enable a user to select a machine tool program to communicate to a machine tool controller according to an aspect of the invention.

In one embodiment, the communication module 810 is configured to communicate generated machine tool programs 806 to the machine tool controllers 812. An example of a GUI 900 for choosing a machine tool program is shown in FIG. 9. Using such a GUI, a user can select the machine tool program 902 from a menu of programs, and initiate communication of such machine tool program to a machine tool controller. A GUI may also be used to select the machine tool to which the machine tool program should be communicated.

System configuration 800 is merely an illustrative embodiment of a system operable to communicate with a plurality of NC Controllers. Such an illustrative embodiment is not intended to limit the scope of the invention, as any of numerous other implementations of such a system, for example, variations of system 800, are possible and are intended to fall within the scope of the invention. None of the claims set forth below are intended to be limited to any particular implementation of such a system, unless such claim includes a limitation explicitly reciting a particular implementation.

Figure 10:
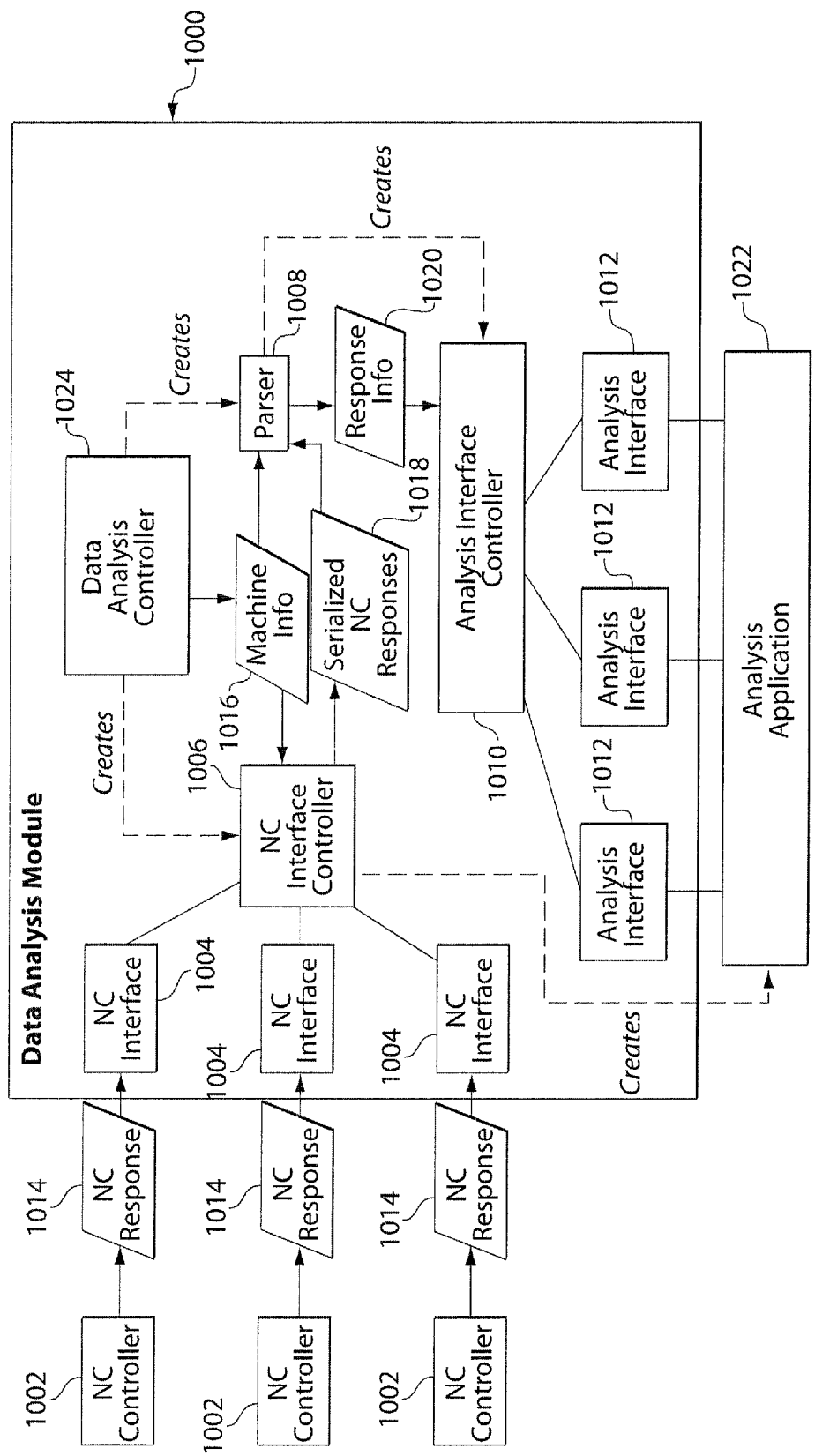
FIG. 10 is a block diagram illustrating an example of a system architecture to manage data generated through the use of machine tools.

FIG. 10 illustrates an embodiment of a Data Server Module 1000 operable to communicate with a plurality of NC Controllers 1002 concurrently. The Data Server Module 1000 may include any of a variety of components, including any of NC Interfaces 1004, NC Interface Controllers 1006, Parser 1008, Analysis Interface Controller 1010; Analysis Interfaces 1012, which may be configured to exchange information such as NC Responses 1014, Machine Info 1016, Serialized NC Responses 1018 and Response Info 1020 as described below.

Machine Info 1016 maintains information corresponding to each NC Controller 1002 currently active (i.e., in the process of transmitting one or more NC Responses 1014 to the Data Server Module 1000). Such information may include information about the communication channel over which the NC Controller communicates with the Data Server Module 1000, information about the NC Controller itself, information about the NC machine under control of the NC Controller, and information about an NC Interface 1004 corresponding to the NC Controller 1002. Machine Info 1016 may include information regarding the type of communication channel being used to transmit NC responses and attributes of that channel. For example, Machine Info 1016 may include information specifying whether the NC controller 1002 is communicating using a channel with a serial single interface, a serial dual interface, a TCP/IP interface, or a high speed serial bus (HSSB) interface. In the case of a TCP/IP interface, Machine Info 1016 may include information regarding an IP address and a port address.

Information about the NC machine controlled by an NC controller 1002 may include the type of NC machine (e.g., vertical or horizontal), the type of axes (e.g., linear or rotary), axes identifiers and axes limits, an offset (e.g., the offset vector from the gage point of the spindle to the sensing point of the sensor), a sensor change procedure, and a sensor enable procedure. Each NC controller 1002 may communicate with the Data Server Module 1000 over multiple communication channels, and Machine Info 1016 may include information specifying a certain communication channel of the multiple channels over which to communicate with the NC controller 1002. Machine Info 1016 may include any combination of the information described above and may store additional information.

Data may be communicated from the NC Controllers 1002 to the Data Server Module 1000 in one or more NC Responses 1014, which may conform to one or more NC Response protocols. One embodiment of an NC Response protocol is shown in Appendix A.

For each NC controller 1002, the Data Server Module 1000 may include an NC Interface 1004 to receive NC Responses 1014 from the NC controller 1002. The Data Server Module 1000 may include a Data Analysis Controller 1024 to manage the NC Interfaces 1004, and may use information included in Machine Info 1016 to do so. NC Interface Controller 1006 may be configured to serialize the NC Responses 1014 received asynchronously from the NC Interface 1004 and to forward the serialized NC Responses 1018 to Parser 1008.

Parser 1008 may be configured to check the integrity of each serialized NC Response 1014 and strip away certain fields within the NC Responses 1014. The Parser then may send Response Info 1020 to the Analysis Interface Controller 1006.

For each NC controller 1002 in the process of transmitting NC Responses 1014 to the Data Server Module 1000, one or more Analysis Interfaces 1012 may be implemented. Each Analysis Interface may maintain a connection with the Analysis Application 1022 (e.g., a dimensional metrology application), which performs the analysis on the Response Info 1020. The Response Info 1020 may be forwarded to the appropriate Analysis Interface 1012 by the Analysis Interface Controller 1010, which may be configured to manage the Analysis Interfaces 1012.

In an embodiment, the Response Info 1020 received from an NC controller 1002 is stored on a storage medium accessible to a corresponding Analysis Interface 1012. Each Analysis Interface 1012 may be configured to access the Response Info 1020 from the storage info. For example, Analysis Interface 1012 may be configured with an attribute that points to a File Object (e.g., a journal file) that stores the Response Info 1020 for the Analysis Interface 1012.

The Analysis Application 1022 may be a dimensional metrology application, for example, PC-DMIS® available from Wilcox Associates. The Analysis Application 1022 may be configured to analyze the Response Info 1020, produce reports and/or update statistical databases. It is to be appreciated that a type of application other than PC-DMIS® may be implemented by the Analysis Application 1022.

Data Server Module 1000 and components thereof (e.g., 1004, 1006, 1008, 1010, 1012, 1014, 1016, 1018, 1020, 1022, and 1026) may be implemented using software (e.g., C, C#, C++, Java, or a combination thereof), hardware (e.g., one or more application-specific integrated circuits), firmware (e.g., electrically-programmed memory) or any combination thereof. One or more of the components of Data Server Module 1000 may reside on a single system (e.g., a single computer), or one or more components may reside on separate, discrete systems. Further, each component may be distributed across multiple systems, and one or more of the systems may be interconnected.

Further, on each of the one or more systems that include one or more components of Data Server Module 1000, each of the components may reside in one or more locations on the system. For example, different portions of such components may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

Data Server Module 1000 may be implemented on a computer system described below in relation to FIGS. 11 and 12.

In an embodiment, any of the Data Server Module 1000 and/or its components may implemented as objects using object-oriented programming techniques. For example, Data Analysis Controller 1024 may be a standalone executable object that instantiates instances of other objects such as NC Interface Controller 1006, NC Interfaces 1004, Parser 1008 and Machine Info 1016, for example, in response to initial communications from one or more NC Controllers 1002. Parser 1008 may be configured to instantiate an instance of Analysis Interface Controller 1010, which may be a container object, and instances of Analysis Interfaces 1012. In response to the Analysis Interface Controller 1010 being instantiated, Analysis Application 1022 may be instantiated, for example, by the Analysis Interface Controller 1010.

Data Server Module 1000 is merely an illustrative embodiment of a system operable to communicate with a plurality of NC Controllers 1002 concurrently. Such an illustrative embodiment is not intended to limit the scope of the invention, as any of numerous other implementations of such a system, for example, variations of Data Server Module 1000, are possible and are intended to fall within the scope of the invention. None of the claims set forth below are intended to be limited to any particular implementation of such a system, unless such claim includes a limitation explicitly reciting a particular implementation.

Various embodiments according to the invention may be implemented on one or more computer systems. These computer systems, may be, for example, general purpose computers such as those based on Intel PENTIUM type processor, Motorola PowerPC, Sun UltraSPARC, Hewlett-Packard PA-RISC processors, or any other type of processor. It should be appreciated that one or more of any type computer system may be used to program a machine tool controller and to analyze the results of executing the program according to various embodiments of the invention. Further, the software design system may be located on a single computer or may be distributed among a plurality of computers attached by a communications network.

A general-purpose computer system according to one embodiment of the invention is configured to program a machine tool controller and to analyze the results of executing the program. It should be appreciated that the system may perform other functions, for example, controlling a CMM or other machine measurement tool, and the invention is not limited to having any particular function or set of functions.

Figure 11:
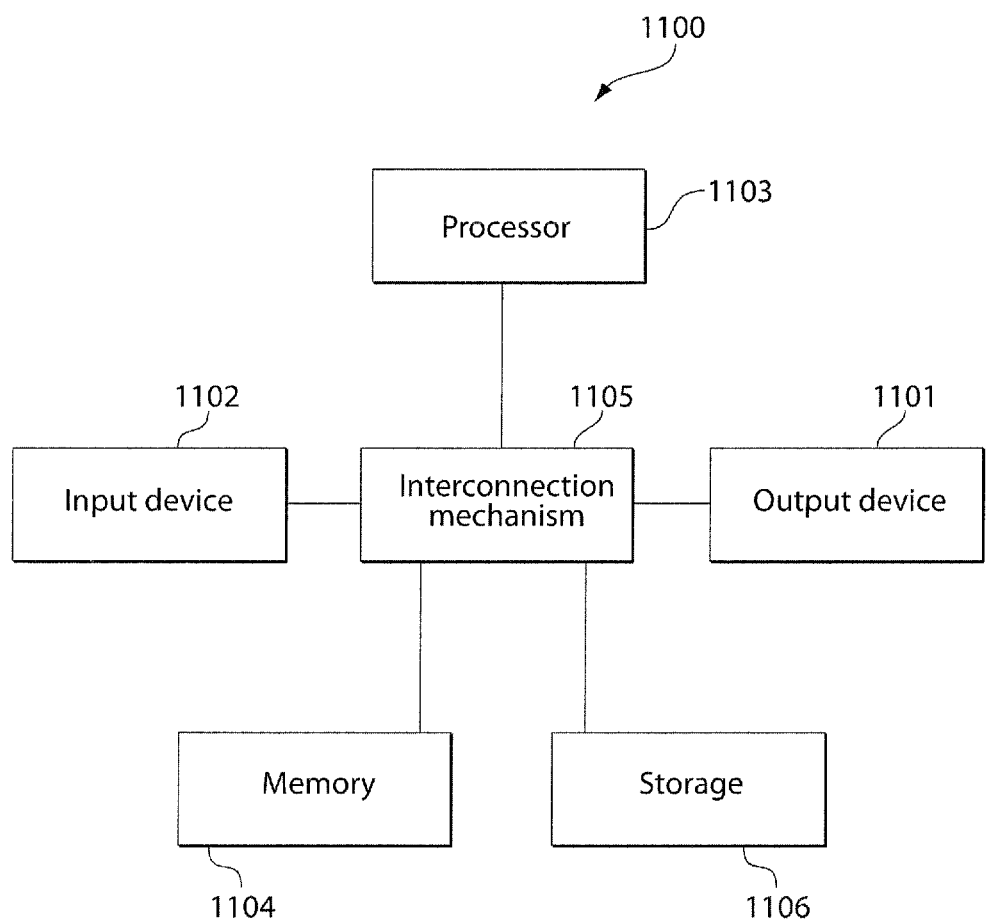
FIG. 11 is a block diagram of one embodiment of a general-purpose computer system.

For example, various aspects of the invention may be implemented as specialized software executing in a general-purpose computer system 1100 such as that shown in FIG. 11. The computer system 1100 may include a processor 1103 connected to one or more memory devices 1104, such as a disk drive, memory, or other device for storing data. Memory 1104 is typically used for storing programs and data during operation of the computer system 1100. Components of computer system 1100 may be coupled by an interconnection mechanism 1105, which may include one or more busses (e.g., between components that are integrated within a same machine) and/or a network (e.g., between components that reside on separate discrete machines). The interconnection mechanism 1105 enables communications (e.g., data, instructions) to be exchanged between system components of system 1100. Computer system 1100 also includes one or more input devices 1102, for example, a keyboard, mouse, trackball, microphone, touch screen, and one or more output devices 1101, for example, a printing device, display screen, speaker. In addition, computer system 1100 may contain one or more interfaces (not shown) that connect computer system 1100 to a communication network (in addition or as an alternative to the interconnection mechanism 1105).

Figure 12:
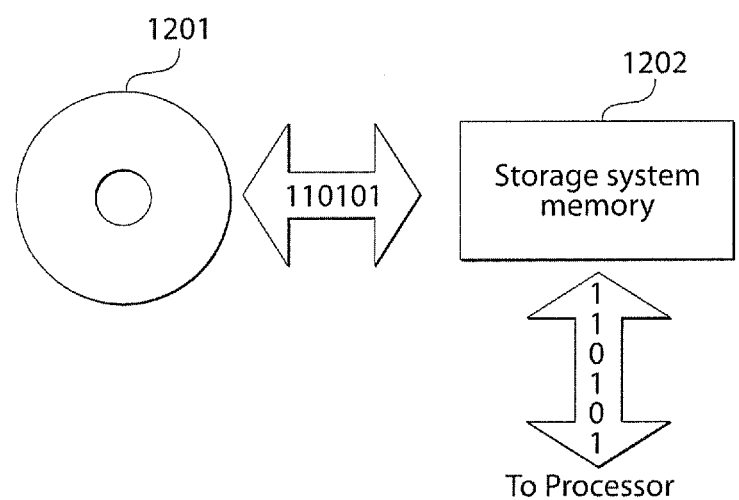
FIG. 12 is a block diagram of one embodiment of a storage system.

The storage system 1106, shown in greater detail in FIG. 12, typically includes a computer readable and writeable nonvolatile recording medium 1201 in which signals are stored that define a program to be executed by the processor or information stored on or in the medium 1201 to be processed by the program. The medium may, for example, be a disk or flash memory. Typically, in operation, the processor causes data to be read from the nonvolatile recording medium 1201 into another memory 1202 that allows for faster access to the information by the processor than does the medium 1201. This memory 1202 is typically a volatile, random access memory such as a dynamic random access memory (DRAM) or static memory (SRAM). It may be located in storage system 1106, as shown, or in memory system 1104, not shown. The processor 1103 generally manipulates the data within the integrated circuit memory 1104, 1202 and then copies the data to the medium 1201 after processing is completed. A variety of mechanisms are known for managing data movement between the medium 1201 and the integrated circuit memory element 1104, 1202, and the invention is not limited thereto. The invention is not limited to a particular memory system 1104 or storage system 1106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1100 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architecture or components that that shown in FIG. 11.

Computer system 1100 may be a general-purpose computer system that is programmable using a high-level computer programming language. Computer system 1100 may be also implemented using specially programmed, special purpose hardware. In computer system 1100, processor 1103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, Linux, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., Data Server Modules) to one or more client computers, or to perform an overall task as part of a distributed system. For example, various aspects of the invention may be performed on a client-Data Server Module system that includes components distributed among one or more Data Analysis Module systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages also may be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent or variant of such means, known now or later developed, for performing the recited function. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements

What is claimed is:

1. A method of using a machine system, which includes a machine tool including a probe, a machine-tool controller, drive motors for moving the probe about a workpiece and a computer, comprising the steps of:

defining with the computer a measurement path over a workpiece;

generating measuring-machine instructions adapted to drive a coordinate measuring machine according to the measurement path;

translating the measuring-machine instructions into machine-tool instructions in a form to be executed on the machine-tool controller; and transmitting the translated measuring-machine instructions to the machine-tool controller such that the machine-tool controller controls the drive motors of the machine tool and thereby moves the probe about the workpiece according to the measurement path.

2. The method according to claim 1, wherein the step of defining includes using a dimensional-metrology program.

3. The method according to claim 2, further comprising collecting measurement signals, transmitting the measurement signals to the computer and analyzing the measurement signals using the dimensional-metrology program.

4. The method according to claim 1, further comprising generating control signals for the machine tool based on the step of analyzing the measurement signals.

5. The method according to claim 1, wherein the step of translating includes mapping measuring-machine probing cycles to machine-too(probing cycles.

6. The method according to claim 1, wherein the step of defining a measurement path includes using one of a dimensional metrology program or a computer assisted drafting program to define the measurement path.

7. The method according to claim 1, further comprising generating machine tool instructions using the machine-tool controller to modify the transmitted measuring machine instructions.

8. A machining system comprising:

a machine tool including a motor, the machine tool adapted to receive a probe;

a machine-tool controller that executes a machine tool program and translates the program into control signals to control a motor; and a computer in communication with the machine-tool controller, the computer including a dimensional-metrology-program module and a program-generator module, wherein the dimensional-metrology-program module is configured to generate a set of instructions in a form suitable to control the acquisition of measurements by a measuring machine, and wherein the program-generator module generates the machine tool program from the dimensional-metrology-program module, and the machine tool program is in a form suitable to control the motor of the machine tool and to be modified by a machine tool operator. using only the machine-tool controller.

9. A machining system according to claim 8, wherein the machine-tool controller is adapted to receive measurement signals from the machine tool and the computer, the machining system further comprising an analysis module to analyze data collected by the machine-tool controller.

10. A machining system according to claim 8, further comprising a server in communication with the machine tool for exchanging data between the machine-tool controller and the computer.

* * * * *